United States Patent
Fu et al.

(10) Patent No.: US 11,551,027 B2
(45) Date of Patent: Jan. 10, 2023

(54) OBJECT DETECTION BASED ON A FEATURE MAP OF A CONVOLUTIONAL NEURAL NETWORK

(71) Applicant: MICROSOFT TECHNOLOGY LICENSING, LLC, Redmond, WA (US)

(72) Inventors: Jingjing Fu, Redmond, WA (US); Yao Zhai, Redmond, WA (US); Yan Lu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 59 days.

(21) Appl. No.: 16/641,609

(22) PCT Filed: Jun. 21, 2018

(86) PCT No.: PCT/US2018/038660
§ 371 (c)(1),
(2) Date: Feb. 24, 2020

(87) PCT Pub. No.: WO2019/040168
PCT Pub. Date: Feb. 28, 2019

(65) Prior Publication Data
US 2021/0158087 A1    May 27, 2021

(30) Foreign Application Priority Data
Aug. 25, 2017    (CN) .......................... 201710744908.7

(51) Int. Cl.
*G06K 9/62*    (2022.01)
(52) U.S. Cl.
CPC ......... *G06K 9/6232* (2013.01); *G06K 9/6268* (2013.01)

(58) Field of Classification Search
None
See application file for complete search history.

(56) References Cited

U.S. PATENT DOCUMENTS 6,285,992 B1    9/2001    Kwasny et al.
6,449,384 B2    9/2002    Laumeyer et al.
(Continued)

FOREIGN PATENT DOCUMENTS

CN    105718878 A    6/2016
CN    106372390 A    2/2017
(Continued)

OTHER PUBLICATIONS

Jifeng Dai et al: "R-FCN: Object Detection via Region-based Fully Convolutional Networks", Advances in neural information processing systems (Jun. 21, 2016), XP055486238 (Year: 2016).*
(Continued)

*Primary Examiner* — Tahmina N Ansari

(57) ABSTRACT

Implementations of the subject matter described herein relate to object detection based on deep neural network. With a given input image, it is desired to determine a class and a boundary of one or more objects within the input image. Specifically, a plurality of channel groups is generated from a feature map of an image, the image including at least a region corresponding to a first grid. A target feature map is extracted from at least one of the plurality of channel groups associated with a cell of the first grid. Information related to an object within the region is determined based on the target feature map. The information related to the object may be a class and/or a boundary of the object.

20 Claims, 5 Drawing Sheets

(56) References Cited

U.S. PATENT DOCUMENTS

| | | | |
|---|---|---|---|
| 8,494,259 | B2 | 7/2013 | Aguilar et al. |
| 9,195,903 | B2 | 11/2015 | Andreopoulos et al. |
| 9,202,144 | B2 | 12/2015 | Wang et al. |
| 9,514,391 | B2 | 12/2016 | Perronnin et al. |
| 2006/0074653 | A1 | 4/2006 | Mitari et al. |
| 2007/0065003 | A1 | 3/2007 | Kellerman et al. |
| 2008/0008376 | A1 | 1/2008 | Andel et al. |
| 2011/0142301 | A1 | 6/2011 | Boroczky et al. |
| 2012/0170852 | A1 | 7/2012 | Zhang et al. |
| 2016/0342863 | A1 | 11/2016 | Kwon et al. |
| 2017/0124432 | A1 | 5/2017 | Chen et al. |
| 2018/0137338 | A1* | 5/2018 | Kraus ............. G06K 9/6259 |
| 2021/0158087 | A1* | 5/2021 | Fu ............. G06K 9/3233 |
| 2021/0182713 | A1* | 6/2021 | Kar ............. G06K 9/627 |
| 2021/0201010 | A1* | 7/2021 | Shao ............. G06F 17/18 |

FOREIGN PATENT DOCUMENTS

| | | |
|---|---|---|
| CN | 106845374 A | 6/2017 |
| EP | 2714926 B1 | 7/2015 |

OTHER PUBLICATIONS

"First Office Action and Search Report Issued in Chinese Patent Application No. 201710744908.7", dated May 7, 2021, 15 Pages.

Jifeng Dai et al. "R-FCN: Object Detection via Region-based Fully Convolutional Networks", arXiv:1605.06409v2 [cs.CV] (2016).

Jifeng Dai et al. "Deformable Convolutional Networks", arXiv:1703.06211v3 [cs.CV] (2017).

Bo Li et al. "Object Detection via End-to-End Integration of Aspect Ratio and Context Aware Part-based Models and Fully Convolutional Networks", arXiv:1612.00534v1 [cs.CV] (2016).

Bo Li et al. "Object Detection via Aspect Ratio and Context Aware Region-based Convolutional Networks", arXiv:1612 00534v2 [cs CV] (2017).

International Search Report and Written Opinion for PCT/US2018/038660, dated Sep. 10, 2018.

Li, et al., "Joint Feature Re-Extraction and Classification using an Iterative Semi-Supervised Support Vector Machine Algorithm", In Journal of Machine Learning, Nov. 17, 2007, pp. 33-53.

Girshick, Ross B.., "Fast R-CNN", In Proceedings of The IEEE International Conference on Computer Vision, Dec. 7, 2015, 9 Pages.

"Second Office Action Issued in Chinese Patent Application No. 201710744908.7", dated Sep. 18, 2021, 15 Pages.

Office Action Issued in European Patent Application No. 18740058.5, dated Oct. 12, 2021, 5 Pages.

"Office Action Issued in Chinese Patent Application No. 201710744908.7", dated Feb. 15, 2022, 8 Pages.

* cited by examiner

OBJECT DETECTION BASED ON A FEATURE MAP OF A CONVOLUTIONAL NEURAL NETWORK

This application is a U.S. National Stage Application of PCT/US2018/038660, Jun. 21, 2018, which claims priority to Chinese Patent Application No. 201710744908.7, filed Aug. 25, 2017, which applications are hereby incorporated by reference. To the extent appropriate, a claim of priority is made to each of the above disclosed applications.

BACKGROUND

Object classification and object detection are two primary tasks of computer vision. The fundamental purpose of the object classification is to correctly assign labels to main objects in the image while the fundamental purpose of the object detection is to provide correct labels and positions for one or more objects (even all objects) in the image. In object detection, a bounding box may be plotted for an object in the image to define a boundary of the object and determine a class for the object. For example, a video of the surrounding environment may be acquired by a camera to detect other objects, such as vehicles, pedestrians, bicycles, or the like, so as to ensure driving safety and compliance.

An image or each frame of a video may include many objects, where some objects may overlap with each other. Thus, performance is an important factor in object detection tasks. In recent years, performance of object detection has been dramatically improved with rapid development of the deep neural network. However, there is still a need to continuously improve the performance of object detection.

SUMMARY

According to implementations of the subject matter described herein, there is provided a solution of object detection based on deep neural network. In this solution, an input image is given and it is desired to determine a class and a boundary of one or more objects within the input image. Specifically, a plurality of channel groups are generated from a feature map of an image, the image including at least a region corresponding to a first grid. A target feature map is extracted from at least one channel group of the plurality of channel groups associated with a cell of the first grid. Information related to an object within the region is determined based on the target feature map. The information related to the objects may be a class and/or a boundary of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In these drawings, same or similar reference signs represent same or similar elements.

DETAILED DESCRIPTION

The subject matter described herein will now be discussed with reference to several example implementations. It is to be understood these implementations are discussed only for the purpose of enabling those skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Example Environment

Figure 1:
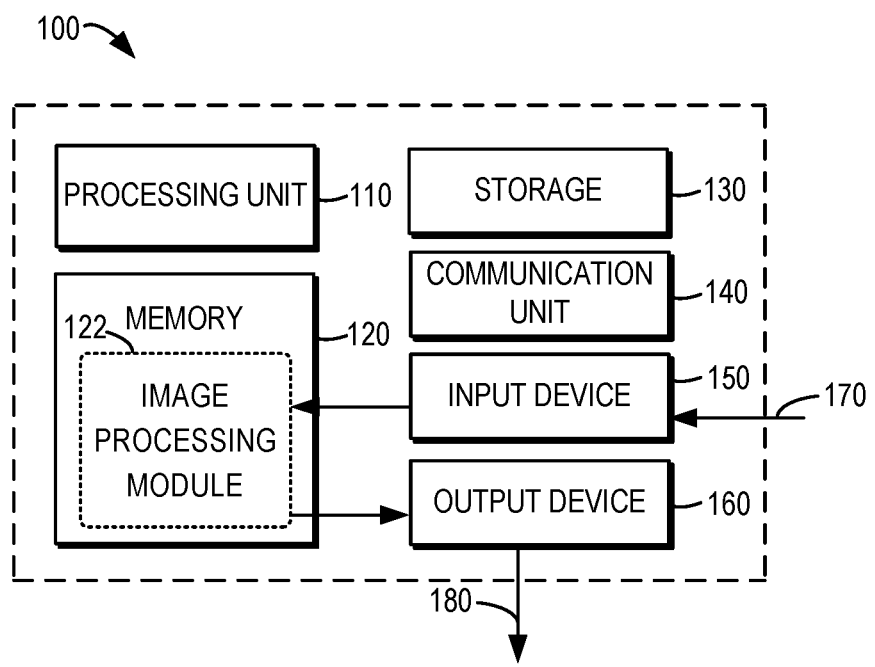
FIG. 1 is a block diagram illustrating a computing device in which implementations of the subject matter described herein can be implemented.

Basic principles and several example implementations of the subject matter described herein will be explained below with reference to the drawings. FIG. 1 is a block diagram illustrating a computing device 100 in which implementations of the subject matter described herein can be implemented. It is to be understood that the computing device 100 as shown in FIG. 1 is only exemplary and shall not constitute any limitations to the functions and scopes of the implementations described herein. As shown in FIG. 1, the computing device 100 includes a computing device 100 in the form of a general purpose computing device. Components of the computing device 100 may include, but not limited to, one or more processors or processing units 110, a memory 120, storage 130, one or more communication units 140, one or more input devices 150, and one or more output devices 160.

In some implementations, the computing device 100 can be implemented as various user terminals or service terminals with computing power. The service terminals can be servers, large-scale computing devices and the like provided by a variety of service providers. The user terminal, for example, is a mobile terminal, a stationary terminal, or a portable terminal of any types, including a mobile phone, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device, or any other combinations thereof including accessories and peripherals of these devices or any other combinations thereof. It may also be contemplated that the computing device 100 can support any types of user-specific interfaces (such as "wearable" circuit and the like).

The processing unit 110 can be a physical or virtual processor and can perform various processing based on the programs stored in the memory 120. In a multi-processor system, a plurality of processing units executes computer-executable instructions in parallel to enhance parallel processing capability of the computing device 100. The processing unit 110 also can be known as a central processing unit (CPU), a microprocessor, a controller, and a microcontroller.

The computing device 100 usually includes a plurality of computer storage media. Such media can be any available media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include an image processing module 122 configured to perform functions of various implementations described herein. The image processing module 122 can be accessed and operated by the processing unit 110 to perform corresponding functions.

The storage 130 may be removable or non-removable medium, and may include machine executable medium, which can be used for storing information and/or data and can be accessed within the computing device 100. The computing device 100 may further include a further removable/non-removable, volatile/non-volatile storage medium. Although not shown in FIG. 1, a disk drive may be provided for reading or writing from a removable and non-volatile disk and an optical disk drive may be provided for reading or writing from a removable and non-volatile optical disk. In such cases, each drive can be connected via one or more data medium interfaces to the bus (not shown).

The communication unit 140 carries out communication with another computing device through communication media. Additionally, functions of components of the computing device 100 can be implemented by a single computing cluster or a plurality of computing machines and these computing machines can communicate through communication connections. Therefore, the computing device 100 can be operated in a networked environment using a logical connection to one or more other servers, a Personal Computer (PC), or a further general network node.

The input device 150 can be one or more various input devices, such as a mouse, a keyboard, a trackball, a voice-input device, and/or the like. The output device 160 can be one or more output devices, for example, a display, a loudspeaker, and/or printer. The computing device 100 also can communicate through the communication unit 140 with one or more external devices (not shown) as required, where the external device, for example, a storage device, a display device, communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

The computing device 100 may be used for implementing object detection in an image or video in accordance with various implementations of the subject matter described herein. A video can be regarded as a sequential series of images, so the terms image and video may be used interchangeably without causing any confusions. In the following, therefore, the computing device 100 may be sometimes known as "an image processing device 100." When performing the object detection, the image processing device 100 may receive an image 170 via the input device 150. The image processing device 100 may process the image 170 to identify one or more objects in the image 170, and define a boundary of the one or more objects. The image processing device 100 may output the determined object and/or its boundary through the output device 160 as an output 180 of the image processing device 100.

Object detection refers to determining a class for one or more objects in an image and determining a boundary of the one or more objects. For example, in an image including a human and a vehicle, it may be identified that the image includes two objects, a human and a vehicle, and the boundaries of the human and the vehicle may be determined respectively. In an actual image processing, one image may include a plurality of classes of objects and the objects of each class may include many instances. In some implementations, an instance of the object may be defined by a bounding box. Correspondingly, the boundary of the object may be determined by determining a boundary of the bounding box. For example, the bounding box may have a rectangular boundary.

The objects to be detected generally have different spatial characteristics at different locations. For example, the head of a human is generally located in the top portion. In existing solutions, however, features are usually extracted independently of the locations. Rather, features of different locations are extracted on all channels of the feature map. There is a need for an improvement in the performance of such object detection solution. Therefore, according to implementations of the subject matter described herein, features in the feature map may be extracted based on different locations of the objects. For example, features of different locations may be extracted on different channels of the feature map.

System Architecture

Figure 2:
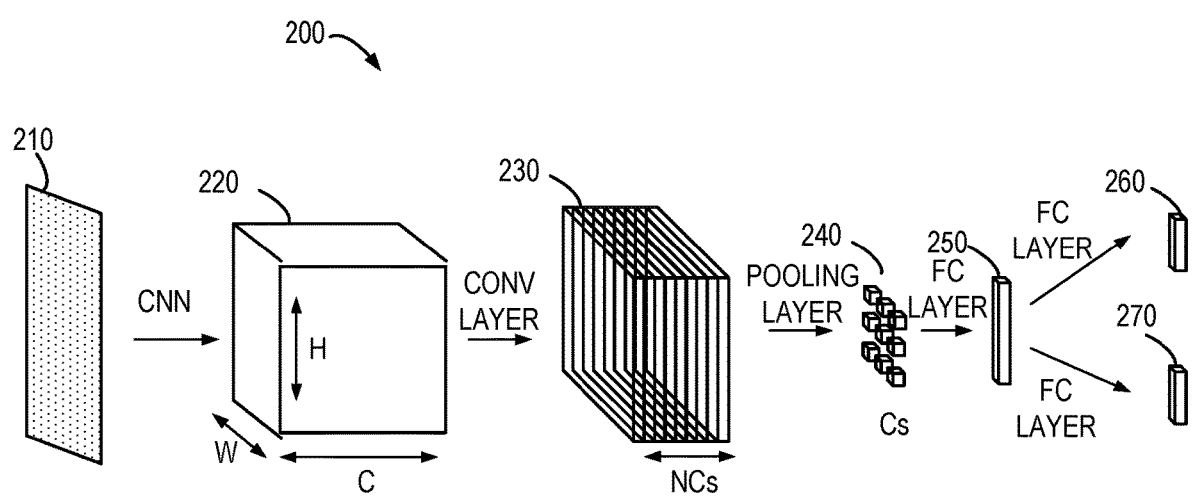
FIG. 2 illustrates an architecture of a feature extraction network according to an implementation of the subject matter described herein.

According to implementations of the subject matter described herein, two-stage object detection framework may be used, the framework including a proposal generation and a region classification. FIG. 2 illustrates an example architecture for a system 200 for object detection according to one implementation of the subject matter described herein, in particular, an architecture for a feature extraction network. A region proposal may be obtained by any proposal generation method currently known or to be developed in the future and the subject matter described herein is not limited in this regard. The proposal generation portion is not shown in order not to obscure the inventive concept of the subject matter described herein. The architecture as shown in FIG. 2 may be implemented at the image processing module 122 of the computing device 100 as shown in FIG. 1.

As shown in FIG. 2, the system 200 sends an image 210 received from the input device 150 to a convolutional neural network to convert the image 210 into a feature map 220. The convolutional neural network may be any suitable convolutional neural network for feature extraction currently known or to be developed in the future, including for example ResNet, GoogLeNet, VGG, AlexNet, or the like. In some implementations, the feature map 220 may be a feature map of an entire image 210. In some implementations, the convolutional neural network may be a full convolutional network, for example, ResNet and GoogLeNet. The feature map 220 may also be known as a convolutional feature map.

As shown in FIG. 2, the feature map 220 includes C channels, and has a spatial dimension of H×w. Accordingly, the dimension of the feature map 220 is H×W×C. For example, the channel number C of the feature map 220 is 2048 for ResNet-101; and the channel number C of the feature map 220 is 1024 for GoogLeNet.

In response to obtaining the feature map 220, the system 200 may convert the feature map 220 into a feature bank 230. The feature bank can include a plurality of channel groups and FIG. 2 illustrates 9 channel groups as an example.

In some implementations, the feature map 220 may be converted into the feature bank 230 by a convolution operation. The convolution operation may be performed by a convolutional layer. For example, N channel groups for the entire image may be generated by the convolutional layer, so as to extract N×Cs-d features for each spatial position in the feature map 220, where Cs is the channel number of a channel group. The channel number Cs of each channel group may be less than the channel number C of the feature map 220 to order to achieve the effect of dimension reduction. For example, the channel number Cs of each channel group may be 20, 40, or the like. Due to the introduction of a spatial-selective pooling layer, the precision of the system can still be maintained although dimension reduction is introduced to the feature bank 230.

In some implementations, a Region Proposal Network (RPN) can generate one or more region proposals or regions of interests (RoI) based on the feature map 220 for object detection. Because RPN may share the convolutional network with the object detection, computation cost and computational overheads may be reduced. According to FIG. 2, a selective pooling layer is applied into the feature bank 230 for each RoI to obtain a target feature map 240. In this way, features of the RoI at each spatial position of the feature bank 230 may be pooled for a particular channel range. For example, the pooling operation may be maximum pooling, average pooling, or the like.

As shown in FIG. 2, the extracted target feature map 240 may be provided to a fully connected layer to obtain a feature vector 250. Because the fully connected layer is connected to each feature of the feature map 240, the layer can organically merge features in the target feature map. Due to the target feature map extracted by the selective pooling, the detection sub-network may be simplified into a lightweight fully connected layer, e.g., 100-d, 400-d, or the like. The fully connected layer may have substantially less parameters than the conventional RoI classifier. Moreover, the design can also have such advantages as reduced operating time, accelerated detection, and so on.

In some implementations, two fully connected layers may be disposed after the feature vector 250 to obtain feature vectors 260 and 270 respectively. In this way, the feature vectors may be used to obtain a RoI classification score and bounding box regression offsets, so as to determine a class of the object within the RoI and its accurate boundary. The detection sub-network in the system 200 as shown in FIG. 2 includes only three fully connected layers, where a first fully connected layer can effectively associate and integrate features in the target feature map 240 to obtain the feature vector 250, a second fully connected layer can design and train the feature vector 250 for classification application to obtain the feature vector 260, and a third fully connected layer can train and design the feature vector 250 for regression application to obtain the feature vector 270. Accordingly, the detection sub-network is a very simple and efficient detection sub-network, which significantly improves the computation efficiency compared with the conventional detection sub-network that requires more layers.

Figure 4:
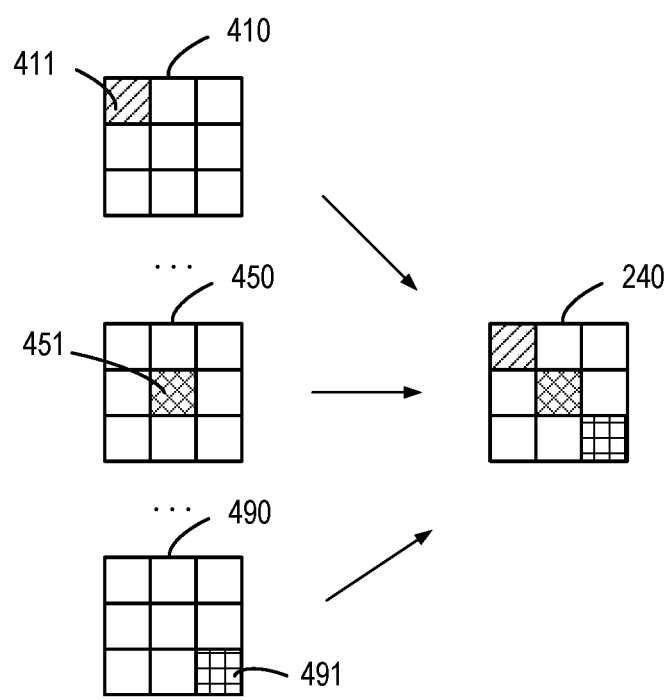
FIG. 4 illustrates a schematic diagram of a pooling operation according to an implementation of the subject matter described herein.
Figure 5:
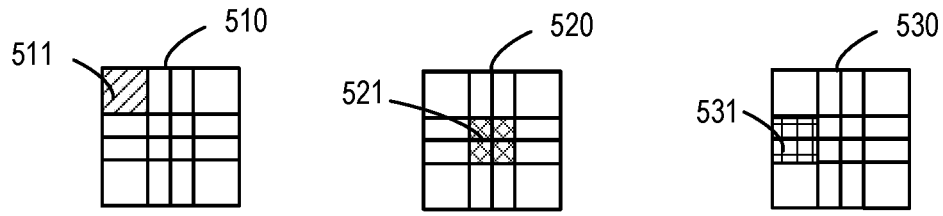
FIG. 5 illustrates a schematic diagram of a pooling operation according to another implementation of the subject matter described herein.

With the effective feature representation and detection sub-network, the architecture can achieve the effects of dimension reduction and region selection to fulfill satisfactory performance when less parameters and rapid test speed are ensured. Example embodiments of generation of the feature bank and selective pooling will be introduced in detail below with reference to FIGS. 3-5 to more clearly explain the subject matter described herein. It is to be understood that FIGS. 3-5 are provided only for the purpose of illustration without limiting the scope of the subject matter described herein.

Feature Bank

Figure 3:
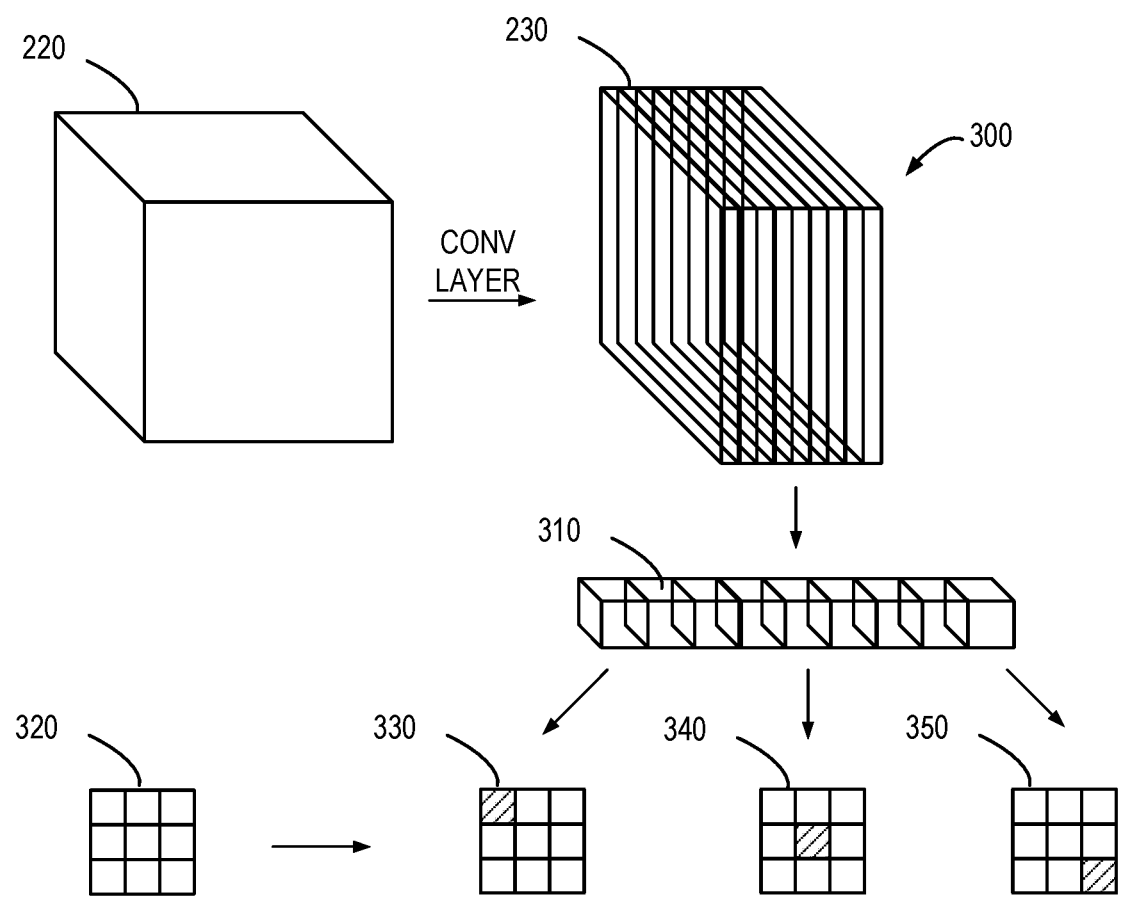
FIG. 3 illustrates a schematic diagram for generating a feature bank according to an implementation of the subject matter described herein.

FIG. 3 illustrates example architecture of a system 300 for generating a feature bank 230 according to an implementation of the subject matter described herein. As shown in FIG. 3, a grid 320 corresponds to a RoI and includes nine cells. Correspondingly, the feature bank 230 includes nine channel groups, and each channel group may include Cs channels. In other words, the feature bank 230 includes the same number of channel groups as the cells of the grid 320. Therefore, the size of the feature bank is H×W×NCs, where H and W represent spatial dimensions of the feature map and the channel number of the feature bank is NCs.

As shown in FIG. 3, when a spatial position of the feature map 220 is located at the top left corner of the grid 320 (indicated by the cell 330), the feature vector of the spatial position is extracted to the first channel group. When a spatial position of the feature map 220 is located at the center of the grid 320 (indicated by the cell 340), the feature vector of the spatial position is extracted to the fifth channel group. When a spatial position of the feature map 220 is at the bottom right corner of the grid 320 (indicated by the cell 350), the feature vector of the spatial position is extracted to the ninth channel group. FIG. 3 only illustrates three representative channel groups. However, it is to be understood that other channel groups also have similar representations. In this way, the feature vector including nine vectors is extracted for each spatial position of the feature map, so as to form the feature bank 230.

In the feature bank 230, each channel group corresponds to a certain sub-region of RoI or a certain cell of the grid 320. For example, in the example of FIG. 3, the first channel group corresponds to a cell at the top left corner of the grid 320, the fifth channel group corresponds to a cell at the center of the grid 320, and the ninth channel group corresponds to a cell of the grid 320 and so forth.

The concept of generating a feature bank has been introduced above with reference to FIG. 3; however, it is to be understood that the process of converting the feature map 220 into the feature bank 230 only involves applying one or more convolutional layers to the feature map 220 without any space-related operations. Spatial correlation of different channel groups of the feature bank 230 is obtained during the training process by extracting the target feature map through the selective pooling.

It is to be understood that the grid 320 may have a different dimension, for example 2×2. In this case, if the channel number Cs of each channel group is set to 40, a feature bank of 160 channels will be generated in total. Each channel group with 40 channels corresponds to a top left, a top right, a bottom left, or a bottom right position of the grid, respectively. Hence, each cell in the grid may be pooled from the corresponding 40 channels according to its relative position in the subsequent selective pooling.

Selective Pooling

FIG. 4 is a schematic diagram illustrating a pooling operation according to an implementation of the subject matter described herein. To facilitate description, FIG. 4 only illustrates a portion of the cross-section of the feature bank 230 at the spatial dimension. This portion is determined by RoI or a pooling grid.

In FIG. 4, the dimension of the pooling grid (also known as a first grid) is set to be 3×3, so as to be identical to the dimension of the grid 320 (also known as a second grid) for constructing the feature bank 230 in FIG. 3. The pooling grid may be a RoI obtained by RPN, and the image includes at least a region corresponding to the pooling grid. In some implementations, the region proposal may be obtained in the image through an anchor box. In this way, one RoI or pooling grid may correspond to nine regions of different sizes in the image.

As shown in FIG. 4, grids 410, 450, and 490 show different channel groups in the feature bank 230, respectively. The grid 410 corresponds to the first channel group including channels 1 to Cs; the grid 450 corresponds to the fifth channel group including channel 1+(5−1)Cs=1+4Cs to channel 5Cs; the grid 490 corresponds to the ninth channel group including channel 1+(9−1)Cs=1+8Cs to channel 9Cs. FIG. 4 only illustrates three representative channel groups; however, it is to be understood that other channel groups also have similar representations.

As described above, in the process of generating the feature bank 230, the first channel group corresponds to the cell at the top left corner. Accordingly, if a first cell 411 of the pooling grid is determined to overlap a cell in the grid 320 corresponding to the first channel group, the first channel group may be selected to perform the pooling operation for the first cell 411. In the process of generating the feature bank 230, the fifth channel group corresponds to a center block. Accordingly, if a second cell 450 of the pooling grid is determined to overlap a cell in the grid 320 corresponding to the fifth channel group, the fifth channel group may be selected to perform the pooling operation for the second cell 450. In the process of generating the feature bank 230, the ninth channel group corresponds to the bottom right block. Accordingly, if a third cell 490 of the pooling grid is determined to overlap a cell in the grid 320 corresponding to the ninth channel group, the ninth channel group may be selected to perform the pooling operation for the third cell 490.

A target feature map 400 may be generated after performing the pooling operation on the feature bank 230. The target feature map 400 has Cs channels, and has the same spatial dimension as the pooling grid. Because only the space-related channel groups are extracted from the plurality of channel groups, the target feature map 400 significantly improves computational performance without losing any information.

The operation of selective pooling has been introduced above with reference to FIG. 4. Generally speaking, for each RoI, the selective pooling pools the spatial extent within the RoI region on the feature map into a feature vector with a fixed length of h×w×Cs, where h and w represent pooling dimension and Cs represents the selected channel number. Specifically, in an RoI grid or window, the k-th channel group has a unique spatial rectangular range Gk. The (m, n)-th cell, if located in the spatial rectangular range Gk, has a correspondence with an index k. Then, the feature value in the (m, n)-th cell is pooled from the k-th channel group. If the (m, n)-th cell belongs to the k-th channel group, the corresponding channel range is located from 1+(k−1)Cs to kCs. Thus, each pooling cell in RoI is pooled from a group of different Cs-d features in the feature bank. Finally, a target feature map 240 with a fixed length of h×w×Cs may be obtained as a representation of the RoI or the pooling grid.

It is noted that although the pooling grid has the same dimension as the grid 320 for generating the feature bank 230 with reference to FIGS. 3 and 4, they may be different from each other and the subject matter described herein is not limited in this regard. FIG. 5 is a schematic diagram illustrating a pooling operation according to another implementation of the subject matter described herein, where the dimension of the pooling grid is 3×3 while the dimension of the grid for generating the feature bank is 2×2.

The feature bank section introduces the situation where the dimension of the grid for generation is 2×2, where the feature bank includes 4 channel groups corresponding to top left, top right, bottom left and bottom right of the grid, respectively. As shown by 510, if a first cell 511 of the pooling grid is determined to overlap a cell in the grid for generation corresponding to the first channel group, the first channel group may be selected to perform the pooling operation for the first cell 511. Accordingly, the operation is identical to the implementation of FIG. 4 for the first cell 511. As shown by 520, if a second cell 521 of the pooling grid is determined to overlap the cells in the grid for generation corresponding to the first to the fourth channel groups, the four channel groups may be selected to perform the pooling operation for the second cell 521. This can be implemented by an interpolation method. As shown by 530, if a third cell 531 of the pooling grid is determined to overlap the cell in the grid corresponding to the first and the third channel groups, the first channel group and the third channel group may be selected to perform the pooling operation for the third cell 531. This can also be implemented by an interpolation method.

It can be seen from the description above that the method described herein may be applied whether the dimension of the grid for generating the feature bank is the same as that of the pooling grid or not, which greatly improves the applicable range of the subject matter described herein. By means of the selective pooling, space-related information may be simply extracted from the feature map, so as to enhance detection performance.

Example Procedure

Figure 6:
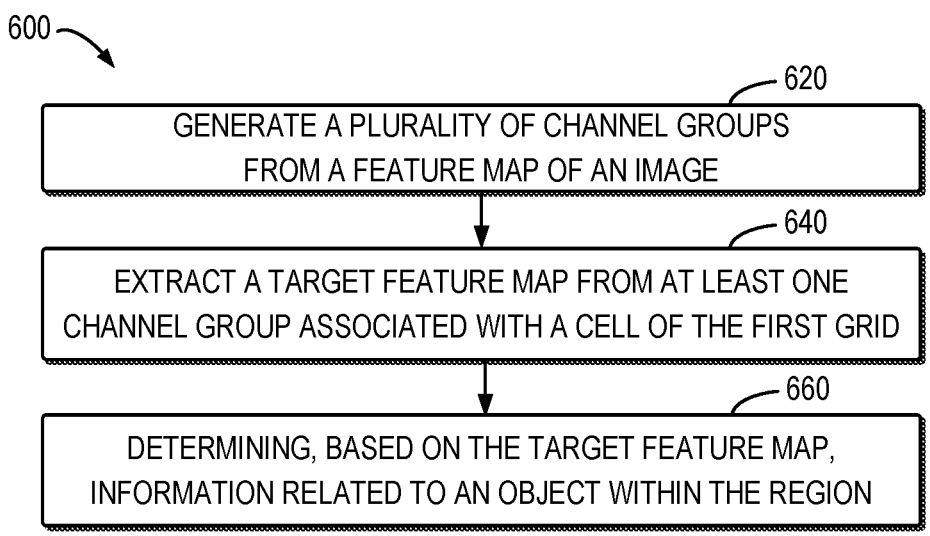
FIG. 6 is a flowchart illustrating a method for object detection according to an implementation of the subject matter described herein.

FIG. 6 is a flowchart illustrating a method 600 for object detection according to some implementations of the subject matter described herein. The method 600 may be implemented by the computing device 100. For example, the method 600 may be implemented at the image processing module 122 in the memory 120 of the computing device 100.

At 620, a plurality of channel groups may be generated from a feature map of an image, the image including at least a region corresponding to a first grid. In some implementations, a plurality of channel groups may be generated by performing a convolution operation on the feature map of the image. The convolution operation may be performed by a convolutional layer. The convolutional layer may be any suitable convolutional layers currently known or to be developed in the future and the subject matter described herein is not limited in this regard.

In some implementations, the feature map of the image may be extracted by a convolutional neural network. For example, the convolutional neural network may be a full convolutional neural network, such as ResNet or GoogLeNet. In addition, a first grid and the regions in the image corresponding to the first grid may be obtained by a Region Proposal Network (RPN). For example, the first grid can have the dimension of 3×3, 2×2, or the like, as described above. For example, if the first grid has the dimension of 3×3, the first grid will have 9 cells. Generally, one proposal region on the image may correspond to one first grid. The image region or the first grid also can be known as a Rot depending on the context.

In some implementations, the channel number of each channel group of the plurality of channel groups is less than the channel number of the feature map. For example, if the channel number of the feature map is 1024, the channel number of the channel group may be 20, 40, or the like. In this way, the effect of dimension reduction may be achieved to lower the demands on computing resources and increase computational speed.

At 640, the target feature map may be extracted from at least one of the plurality of channel groups associated with a cell in the first grid. Because only a portion of the space-related channel groups is extracted from the plurality of channel groups, the target feature map greatly improves the computational performance without missing any information.

In some implementations, the target feature map may be extracted by a pooling operation. In some implementations, a channel group of the plurality of channel groups is associated with a cell in the second grid and the number of channel groups of the plurality of channel groups is the same as the number of cells in the second grid, and extracting the target feature map by the pooling operation includes: determining, from the second grid, at least one corresponding cell overlapping the cell in the first grid; determining at least one channel group of the plurality of channel groups associated with the at least one corresponding cell to be at least one channel group associated with the cell in the first grid; and performing a pooling operation on the at least one channel group.

As described above, the first grid and the second grid may have the same or different dimensions, thereby facilitating a much wider application of this technical solution. If the first grid has the same dimension as the second grid, it can be determined from the second grid a cell overlapping the cell in the first grid. In this case, the pooling operation can be simply regarded as extracting features within the corresponding channels from the feature bank 230 for each cell in the grid.

At 660, information related to an object within the region may be determined based on the target feature map. In some implementations, the information related to the object within the region includes a class and/or a boundary of object within the region.

In some implementations, the feature vector may be determined from the target feature map by a fully connected layer. The information related to the object may be determined based on the feature vector. Thanks to the selective feature extraction at 640, a better object detection effect may be achieved by a lightweight fully connected layer. In some implementations, determining information related to the object includes at least one of: determining a second feature vector by a second fully connected layer based on the first feature vector to determine a class of the object; and determining a third feature vector by a third fully connected layer based on the first feature vector to determine a boundary of the object. The two different fully connected layers can be trained for different applications (classification and regression) to obtain corresponding results.

Example Implementations

Some example implementations of the subject matter described herein are listed below.

In accordance with some implementations, there is provided a device. The device comprises a processing unit; and a memory coupled to the processing unit and comprising instructions stored thereon, the instructions, when executed by the processing unit, causing the device to perform acts comprising: generating a plurality of channel groups from a feature map of an image, the image comprising at least a region corresponding to a first grid; extracting a target feature map from at least one of the plurality of channel groups associated with a cell of the first grid; and determining, based on the target feature map, information related to an object within the region.

In some implementations, extracting the target feature map comprises: extracting the target feature map by a pooling operation.

In some implementations, a channel group of the plurality of channel groups is associated with a cell in a second grid and the number of channel groups of the plurality of channel groups is the same as the number of cells in the second grid, and extracting the target feature map by a pooling operation comprises: determining, from the second grid, at least one corresponding cell overlapping the cell in the first grid; determining at least one of the plurality of channel groups associated with the at least one corresponding cell to be the at least one channel group associated with the cell in the first grid; and performing the pooling operation on the at least one channel group.

In some implementations, generating a plurality of channel groups comprises: generating the plurality of channel groups by performing a convolution operation on the feature map of the image.

In some implementations, the acts further comprise: extracting the feature map of the image by a convolutional neural network.

In some implementations, the number of channels in each of the plurality of channel groups is less than the number of channels of the feature map.

In some implementations, the acts further comprise: determining, via a fully connected layer, a feature vector from the target feature map; and determining the information related to the object based on the feature vector.

In some implementations, determining information related to the object within the region comprises: determining at least one of a class and a boundary of the object.

In accordance with some implementations, there is provided a computer-implemented method. The method comprises generating a plurality of channel groups from a feature map of an image, the image comprising at least a region corresponding to a first grid; extracting a target feature map from at least one of the plurality of channel groups associated with a cell of the first grid; and determining, based on the target feature map, information related to an object within the region.

In some implementations, extracting the target feature map comprises: extracting the target feature map by a pooling operation.

In some implementations, a channel group of the plurality of channel groups is associated with a cell in a second grid and the number of channel groups of the plurality of channel groups is the same as the number of cells in the second grid, and extracting the target feature map by a pooling operation comprises: determining, from the second grid, at least one corresponding cell overlapping the cell in the first grid;

determining at least one of the plurality of channel groups associated with the at least one corresponding cell to be the at least one channel group associated with the cell in the first grid; and performing the pooling operation on the at least one channel group.

In some implementations, generating a plurality of channel groups comprises: generating the plurality of channel groups by performing a convolution operation on the feature map of the image.

In some implementations, the method further comprises: extracting the feature map of the image by a convolutional neural network.

In some implementations, the number of channels of each of the plurality of channel groups is less than the number of channels of the feature map.

In some implementations, the method further comprises: determining, via a fully connected layer, a feature vector from the target feature map; and determining the information related to the object based on the feature vector.

In some implementations, determining information related to the object within the region comprises: determining at least one of a class and a boundary of the object.

In accordance with some implementations, there is provided a computer program product comprising instructions tangibly stored on a computer readable medium, the instructions, when executed by a machine, causing the machine to perform a method comprising: generating a plurality of channel groups from a feature map of an image, the image comprising at least a region corresponding to a first grid; extracting a target feature map from at least one channel group of the plurality of channel groups associated with a cell of the first grid; and determining, based on the target feature map, information related to an object within the region.

In some implementations, extracting the target feature map comprises: extracting the target feature map by a pooling operation.

In some implementations, a channel group of the plurality of channel groups is associated with a cell in a second grid and the number of channel groups of the plurality of channel groups is the same as the number of the cells in the second grid, and extracting the target feature map by a pooling operation comprises: determining, from the second grid, at least one corresponding cell overlapping the cell in the first grid; determining at least one of the plurality of channel groups associated with the at least one corresponding cell to be the at least one channel group associated with the cell in the first grid; and performing a pooling operation on the at least one channel group.

In some implementations, generating a plurality of channel groups comprises: generating the plurality of channel groups by performing a convolution operation on the feature map of the image.

In accordance with some implementations, there is provided a computer readable medium stored with computer executable instructions, the computer executable instructions, when executed by a device, causing the device to perform the method of the implementations above.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device comprising:
a processing unit; and
a memory coupled to the processing unit and comprising instructions stored thereon, the instructions, when executed by the processing unit, causing the device to perform acts comprising:
generating a plurality of channel groups from a feature map of an image, the image comprising at least a region corresponding to a first grid, each channel group in the plurality of channel groups corresponding to a sub-region of the region;

extracting a target feature map from at least one of the plurality of channel groups associated with a cell of the first grid;
determining, via a fully connected layer, a feature vector from the target feature map; and
determining, based on the feature vector, information related to an object within the region.

2. The device of claim 1, wherein extracting the target feature map comprises:
extracting the target feature map by a pooling operation.

3. The device of claim 2, wherein a channel group of the plurality of channel groups is associated with a cell in a second grid and the number of channel groups of the plurality of channel groups is the same as the number of cells in the second grid, and extracting the target feature map by a pooling operation comprises:
determining, from the second grid, at least one corresponding cell overlapping the cell in the first grid;
determining at least one of the plurality of channel groups associated with the at least one corresponding cell to be the at least one channel group associated with the cell in the first grid; and
performing the pooling operation on the at least one channel group.

4. The device of claim 1, wherein generating a plurality of channel groups comprises:
generating the plurality of channel groups by performing a convolution operation on the feature map of the image.

5. The device of claim 1, wherein the acts further comprise:
extracting the feature map of the image by a convolutional neural network.

6. The device of claim 1, wherein the number of channels in each of the plurality of channel groups is less than the number of channels of the feature map.

7. The device of claim 1, wherein the acts further comprise:
determining, via a fully connected layer, a feature vector from the target feature map; and
determining the information related to the object based on the feature vector.

8. The device of claim 1, wherein determining information related to the object within the region comprises:
determining at least one of a class and a boundary of the object.

9. A computer-implemented method comprising:
generating a plurality of channel groups from a feature map of an image, the image comprising at least a region corresponding to a first grid;
extracting a target feature map from at least one of the plurality of channel groups associated with a cell of the first grid, each channel group in the plurality of channel groups corresponding to a sub-region of the region;
determining, via a fully connected layer, a feature vector from the target feature map; and
determining, based on the feature vector, information related to an object within the region.

10. The method of claim 9, wherein extracting the target feature map comprises:
extracting the target feature map by a pooling operation.

11. The method of claim 10, wherein a channel group of the plurality of channel groups is associated with a cell in a second grid and the number of channel groups of the plurality of channel groups is the same as the number of cells in the second grid, and extracting the target feature map by a pooling operation comprises:
determining, from the second grid, at least one corresponding cell overlapping the cell in the first grid;
determining at least one of the plurality of channel groups associated with the at least one corresponding cell to be the at least one channel group associated with the cell in the first grid; and
performing the pooling operation on the at least one channel group.

12. The method of claim 9, wherein generating a plurality of channel groups comprises:
generating the plurality of channel groups by performing a convolution operation on the feature map of the image.

13. The method of claim 9, wherein the method further comprises:
extracting the feature map of the image by a convolutional neural network.

14. The method of claim 9, wherein the number of channels of each of the plurality of channel groups is less than the number of channels of the feature map.

15. The method of claim 9, wherein the method further comprises:
determining, via a fully connected layer, a feature vector from the target feature map; and
determining the information related to the object based on the feature vector.

16. One or more computer-readable storage devices comprising computer-executable instructions that, when executed by one or more processors, cause the one or more processors to perform the following operations:
generating a plurality of channel groups from a feature map of an image, the image comprising at least a region corresponding to a first grid;
extracting a target feature map from at least one of the plurality of channel groups associated with a cell of the first grid, each channel group in the plurality of channel groups corresponding to a sub-region of the region;
determining, via a fully connected layer, a feature vector from the target feature map; and
determining, based on the feature vector, information related to an object within the region.

17. The one or more computer-readable media of claim 16, wherein extracting the target feature map comprises:
extracting the target feature map by a pooling operation.

18. The one or more computer-readable media of claim 17, wherein a channel group of the plurality of channel groups is associated with a cell in a second grid and the number of channel groups of the plurality of channel groups is the same as the number of cells in the second grid, and extracting the target feature map by a pooling operation comprises:
determining, from the second grid, at least one corresponding cell overlapping the cell in the first grid;
determining at least one of the plurality of channel groups associated with the at least one corresponding cell to be the at least one channel group associated with the cell in the first grid; and
performing the pooling operation on the at least one channel group.

19. The one or more computer-readable media of claim 16, wherein generating a plurality of channel groups comprises:
generating the plurality of channel groups by performing a convolution operation on the feature map of the image.

20. The one or more computer-readable media of claim 16, wherein the acts further comprise:
   extracting the feature map of the image by a convolutional neural network.

* * * * *